United States Patent Office 3,850,895
Patented Nov. 26, 1974

3,850,895
PROCESS FOR THE PRODUCTION OF POLYMERS AND COPOLYMERS OF ISOBUTYLENE OF HIGH MOLECULAR WEIGHT
Aldo Priola, Sebastiano Cesca, and Giuseppe Ferraris, San Donato Milanese, Italy, assignors to Snam Progetti S.p.A., San Donato Milanese, Italy
No Drawing. Filed Nov. 15, 1972, Ser. No. 306,901
Claims priority, application Italy, Nov. 26, 1971, 31,724/71
Int. Cl. C08d 1/26, 3/10, 3/02
U.S. Cl. 260—85.3 R          6 Claims

ABSTRACT OF THE DISCLOSURE

A process is disclosed whereby butyl rubber of high molecular weight and excellent physical characteristics is readily prepared by copolymerizing isobutylene and isoprene in the presence of a catalyst system consisting of:

(a) a metalorganic compound of aluminum, e.g. $AlEt_2Cl$; and
(b) a compound containing a mobile halogen group or at least one which is easily exchangeable due to the presence of an electrophilic group, e.g. tetrachloro-p-benzoquinone, wherein the molar ratio of compound (a) to compound (b) is between 0.5 and $10^{-4}$, in a reaction medium such as methyl chloride, and in the temperature range between $-100$ and $+30°$ C.

---

This invention relates to a process for the production of polymers and copolymers of isobutylene using a particular catalyst system which enables us to utilize higher reaction temperatures than those previously used industrially; it also enables us to obtain higher yields in polymers having a higher molecular weight and generally better properties, logically dependent upon the operating conditions selected and other factors known to those skilled in the art.

More particularly, this invention relates to an invention for the production of butyl rubber.

It is well known that butyl rubber is industrially produced by means of a process of copolymerization achieved by utilizing cationic type initiators.

In particular, the copolymerization is achieved utilizing $AlCl_3$ in ethyl chloride or methyl chloride solution at $-100°$ C.

The use of a solid catalyst insoluble in common hydrocarbon solvents and only slightly soluble in chloride solvents, has created many difficulties in the effective control of this reaction.

The preparation of the catalyst solution itself is somewhat complex, and in general, it is effected by the passage of a current of ethyl chloride or methyl chloride on a bed of solid aluminum trichloride.

Also the subsequent determination of the catalyst concentration that is achieved through titration of $AlCl_3$ is very complex and it often gives very unexpected results. It is evident, from what is mentioned above, that there has been much effort on the part of various researchers and industries interested in the production of this type of rubber, towards the discovery of new catalyst systems that would simultaneously solve the problems of the dosage for the catalyst and the raising of the temperature of polymerization without of course comprising the properties of the rubber and, in particular, without lowering the value of the molecular weight.

Recently, some researchers have perfected a new soluble catalyst system that enables us to obtain butyl rubber with a high molecular weight at considerably higher temperature than those normally used in industrial processes.

The system in question is based upon a combination of an haloid of Friedel-Crafts modified, for example $AlEt_2Cl$, with an appropriate co-catalyst. These haloids are not usually capable of initiating the polymerization of isobutylene by themselves, or of mixtures of isobutylene diene monomers or other monomers that normally polymerize with a cationic type mechanism.

The polymerization or copolymerization begins only when the co-catalyst is introduced. This co-catalyst may be composed of a substance able to produce protons such as, for example, HCl and other acids of Brönsted, or by a substance capable of supplying carbon ions, such as, for example, chloride of t-butyl. The same applicant owns a patent application pertaining to a procedure for the production of butyl rubber by means of the use of a catalyst system constituted by a reducing aluminium compound and a co-catalyst capable of giving cations for interaction with the catalyst.

The co-catalyst may be a halogen introduced as such, or other interhalogenic compounds.

The process which has now been perfected by us, and which constitutes the subject of the present application, presents all the advantages of the catalyst systems mentioned previously and which are essentially characterized by considerable ease to the control of the polymerization reaction owing of solubility of these catalysts in common organic solvents, so that whenever necessary, it is possible to operate with minimum quantities of solvent or even in its total absence, in which case, the same non-reacted monomer functions as a diluent.

In respect to the processes using haloids of dialkyl-aluminum and strong acids, it also presents the advantage of obtaining products of higher molecular weight and even higher reaction temperatures.

It also presents major regularity in the polymerization process, permitting, in fact, a major control of the temperature and therefore a higher regularity in the polymers produced.

Then, in respect to the systems using halogen solutions and interhalogenic compounds, it has the great advantage of being easier to handle with regard to the compounds used as catalysts.

Besides, it has the still greater advantage of greater ease in dosing the co-catalyst, eventually also during the polymerization, as compared to the Brönsted acids, and it is more economical with regard to the co-catalysts composed of alkylic haloids, especially taking into account the high quality of purity that they must posses. While this application is essentially concerned with the production of butyl rubber, in view of the industrial interest in this substance, it will be easy for the expert on the subject using the catalyst system described herein, to find the ideal conditions for the copolymerization of different monomers.

In particular, the usable mono-olefine may have from 4 to 7 carbon atoms ($C_4-C_7$), while the multi-olefine is generally constituted by a conjugated diolefine having from 4 to 14 carbon atoms ($C_4-C_{14}$), such as isoprene, butadiene, 2,3-dimethyl 1,3-butadiene, while examples of the first may be isobutene, 2-methyl butene-1, 3-methylbutene-1, 2-methyl-butene-2, 4-methyl-pentene-1. As we mentioned, only great industrial interest has prompted us to limit our examples to the case of butyl rubber, that is, to the copolymerization of isobutylene and isoprene in quantities ranging from 90 to 99.5% in isobutylene weight and from 10 to 0.5% in isoprene weight.

The reaction media used are those which are normally used in the art, and that is, ethyl chloride, methyl chloride, or methylene chloride. Hydrocarbon compounds may also be used so long as they are liquid at the temperature of reaction, such as, for example, pentane, isopentane, n- heptane, cyclohexane, or even solvents maintained in a liquid phase at the temperature of reaction, such as the monomer or the monomers used.

The molecular weights of the product obtained vary over a wide range depending upon the conditions employed.

The catalyst system of the invention includes:

(a) A metalorganic compound of aluminum of the formula $AlR_3$ or $AlR_2X$ where X is an atom of halogen and R is a hydrocarbon radical having from 1 to 10 carbon atoms, or hydrogen;

(b) A compound containing mobile halogens or in any event, ones that are easily exchangeable for the presence of one or more electrophile groups of formula

where X is an atom of halogen; Z is nitrogen, carbon or phosphorous; R' is a hydrocarbon radical with from 1 to 10 carbon atoms, hydrogen or it is equal to X; Y is a group selected from:

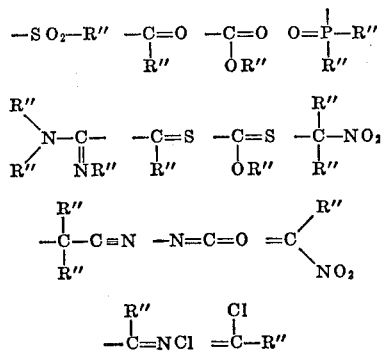

and so on ...;

In the practice of our invention copolymerization is effected in the temperature range between —100 and +30° C. inclusive.

Y' can be equal to Y or to R'; Y and Y' may be, not simultaneously, bivalent radicals with a double bond directly on Z; Y and Y' may be connected to each other cyclically closing themselves on Z, R" is an alkylic or arylic radical, simple or substituted; n and h are 0 or 1.

Specific examples of these co-catalysts are picryl chloride;
chloranyl (2,3,5,6-tetrachloro-p-benzo-quinone);
2,6-dichloroquinone;
2,3-dichloroquinone;
N-chlorosuccinimide;
N-bromo succinimide;
N-chloroacetamide;
N,N-dichlorobenzosulfonamide;
cyanide chloride;
N-2,6-trichloro-p-benzoquinonemine;
trichloro-S-triazine-2,4,6-(1H,3H,5H)trione,
ethylester-dichlorocarbamide;
1,3-dichloro-5,5-dimethylhydantoin;
2,3-dichloro-5,6-dicyan-p-quinone;
2,6,8-trichloropurine.

The catalyst may be preformed or, preferably, the co-catalyst is slowly added on the reaction environment in a second phase, by portions. In any event, the molar relation between the total quantity of compound (b) and compound (a) is less than to 1, preferably between 0.5 and $10^{-4}$.

The molecular weights of the polymers prepared in the following examples were obtained by means of viscosimetric measures of polymer solutions in cyclohexane at 30° C.

After having determined the intrinsic viscosity by extrapolation at C=O of the $Cu\eta/e$ and $Cu\eta ep/e$ curves, the average molecular weight of the single polymers was calculated by the following equation:

$$CuM^\gamma = 11.98 + 1.452\ Cu[\eta]$$

The invention will be more clearly understood from the examination of the following examples, though it must be understood that it is not merely limited to these.

EXAMPLE 1

In a completely glass tubular reactor of a capacity of 300 cm.³, having a mechanical agitator and a thermometric sheat, previously dried by heating under a current of dry Argon, and maintained during the execution of the experiment under a slight overpressure of Argon (20–30 torr in respect to the atmospheric pressure), we condensed 80 cm.³ of $CH_3Cl$, and then we intoduced 28.4 grams of isoprene and 2 mmoles (cc. 0.254) of $AlEt_2Cl$ bringing the temperature to —40° C. by means of a thermostatically controlled bath. To the reaction mixture we subsequently added, under violent agitation, 0.06 mmoles of tetrachloro-p-benzoquinone graduating the addition over a period of 4 minutes during which we had a temperature increase in the amount of 3° C. We continued the shaking for ten minutes after the end of the addition and then we stopped the reaction by adding methanol to the polymer solution which was produced. We obtained 12.65 grams of dry polymer (yield=44.5%) which supplied a value of $[\eta]=2.27$ dl./g., determined in cyclohexane, which corresponds to an average viscosimetric molecular weight equal to 500,000 and an unsaturation content determined by iodometric means, corresponding to 3.2% in isoprene weight.

The polymer obtained was made to undergo vulcanization in split plates using a mixture of the following composition prepared on an open cylinder mixer:

| | Parts |
|---|---|
| Polymer | 100 |
| EPC black | 50 |
| Antioxydant 2246 | 1 |
| ZnO | 5 |
| Stearic Acid | 3 |
| Sulphur | 2 |
| MB TDS (mercapto-benzothiazole-disulphide) | 0.5 |
| TMTD (tetramethyl-thiuramedisulphide) | 1 |

The mixture was vulcanized at 153° C. for 40 and 60 minutes. The properties of the vulcanized material obtained were collected in Table 1; in Table 2 we show as a means of comparison, the properties of a typical sample of commercial butyl rubber determined under the same conditions.

TABLE 1

| | | |
|---|---|---|
| Vulcanization time (minutes) | 40 | 60 |
| Modulus at 100% (kg./cm.²) | 17 | 18 |
| Modulus at 200% (kg./cm.²) | 29 | 33 |
| Modulus at 300% (kg./cm.²) | 46 | 55 |
| Breaking load (kg./cm.²) | 212 | 211 |
| Ultimate elongation, percent | 710 | 660 |
| Permanent set, percent | 35 | 30 |

TABLE II

| | | |
|---|---|---|
| Vulcanization time* (minutes) | 40 | 60 |
| Modulus at 100% (kg./cm.²) | 15 | 16 |
| Modulus at 200% (kg./cm.²) | 27 | 33 |
| Modulus at 300% (kg./cm.²) | 47 | 58 |
| Breaking load (kg./cm.²) | 209 | 210 |
| Ultimate elongation, percent | 715 | 650 |
| Permanent set, percent | 29 | 29 |

* Butyl rubber Enjay B218 with a viscosimetric molecular weight equal to about 450,000 and an unsaturation content corresponding to 2.15% in isoprene weight.

The results obtained showed that the polymer obtained in this experiment, conducted at a temperature included between —37 and —40° C. presents at its vulcanization, properties equal to those of commercial butyl rubber, which, as is known, is produced at a temperature less than —100° C.

EXAMPLE II

We operated under the same conditions and with the same quantities of reagents as described in the previous example with the difference that we used as a co-catalyst, a solution in $CH_3Cl$ containing 0.3 mmoles of N,N'-dichlorobenzene-solfonamide. The experiment was conducted at a temperature of $-40°$ C. and the addition of the co-catalyst was carried out during a period of four minutes for which we noticed an increase of temperature in the amount of $3°$ C. We obtained gr. 13.4 g. of dry polymer (yield=47.2%) having a $[\eta]$, determined in cyclohexane, =1.69 dl./g. ($PM_v$=330,000) and a content in insaturations corresponding to 3.1% in isoprene weight.

The polymer was made to undergo vulcanization according to the methods described in the previous example and the properties of the vulcanized products were very similar to those reported in Table 1.

EXAMPLE III

Using the same methods reported in Example 1, we introduced into the reactor the same quantities of solvent, monomers and $AlEt_2Cl$. The reaction was begun at a temperature of $-40°$ C. by means of a gradual introduction of a solution in $CH_3Cl$ of 0.23 mmoles of chloride of picryl for a period of 8 minutes for which we have an increase in temperature of $4°$ C. We obtained, interrupting the reaction after ten minutes of further agitation, 15.55 g. of dry polymer (yield=55%) which supplied a$[\eta]$=1.8 dl./g. which corresponds to an average viscosimetric molecular weight equal to 360,000 and an isoprene content equal to 3.0% in weight.

The polymer was made to undergo vulcanization as described in Example 1 and the properties of the vulcanized product obtained were very similar to those reported in Table 1.

EXAMPLE IV

We repeated the experiment described in the previous example with the difference that we operated at a temperature of $-30°$ C., adding gradually to the reaction mixture, 0.15 mmoles of chloride of picryl over a period of three minutes for which we had a temperature increase in the amount of $2°$ C. We obtained 12.95 g. of polymer (yield=45.5%) having a $[\eta]$ equal to 1.49 dl./g. ($PM_v$=275,000) and unsaturation contents equal to 3.0% in isoprene weight. The physical properties of the polymer were similar to those reported for the sample in Example 1.

EXAMPLE V

We operated with the same experimental technique previously described and using the same quantities of solvent and monomers, with the difference that we used as a catalyst 2 mmoles of Al (isobutyl)$_2$ Cl and, as a co-catalyst, 0.12 moles of tetrachloro-p.benzoquinone. The addition was carried out slowly at a temperature of $-40°$ C. for a duration of seven minutes, during which we noticed a temperature increase in the amount of $4°$ C. We obtained 15.75 g. of dry polymer (yield=55.5%) having a $[\eta]$=1.52 dl./g. $PM_v$=280,000, a content of unsaturations equal to 1.8 in isoprene weight and physical properties similar to those reported for the sample in Example 1.

EXAMPLE VI

We repeated the experiment previously described, with the difference that we used as a catalyst, 2 mmoles of $AlEt_2Cl$ and, as a co-catalyst 0.18 mmoles of tetrachloro-p.benzoquinone, added gradually over a period of three minutes in which we had a temperature increase equal to $2°$ C. in the reaction mixture. We obtained g. 19.75 of dry polymer (yield=69.5%) having a $[\eta]$=2.12 dl./g. that corresponds to an average viscosimetric PM equal to 460,000 and a content of unsaturations corresponding to 1.8% in isoprene weight. The polymer, after having been made to undergo vulcanization tests, showed characteristics similar to those reported in Table 1.

EXAMPLE VII

We used the same quantities of reagents as described in the previous example with the difference that we used as a catalyst, 2 mmoles of $AlEt_2Br$ and, as a co-catalyst, 0.2 moles of picryl chloride dissolved in $CH_3Cl$. The addition was carried out at a temperature of $-40°$ C. for a period of two minutes for which we had a temperature increase in the amount of $10°$ C. We obtained 16.45 g. of dry polymer (yield=57.8%) having $[\eta]$=1.82 dl./g. ($PM_v$=360,000), a content of unsaturations equal to 3.0% in isoprene weight and physical properties equal to those reported for the sample in Example 1.

EXAMPLE VIII

We repeated the experiment described in the previous example with the difference that we used as a catalyst, 1 mmole of $AlEt_2Cl$ and, as a co-catalyst, a solution of 0.135 mmoles of N-bromo-succinimide in $CH_3Cl$. The addition was carried out at $-40°$ C. for the duration of five minutes for which we noted an increase in temperature in the amount of $2°$ C. We obtained 4.0 g. of dry polymer (yield=14.1%) having a $[\eta]$=1.75 dl./g. ($PM_v$=350,000) and contents of unsaturations equal to 2.03% in isoprene weight.

EXAMPLE IX

We repeated the experiment described in the previous example with the difference that we used 2 mmoles of $AlEt_2Cl$ and, as a co-catalyst, 0.24 mmoles of N-chlorosuccinimide dissolved in $CH_3Cl$. We carried out the addition at $-40°$ C. for a period of five minutes during which we obtained an increase of temperature equal to $2°$ C. of the mass or reaction.

We obtained g. 2.95 of dry polymer (yield=10%) having a $[\eta]$=2.24 dl./g. ($PM_v$=495,000), an unsaturation content equal to 2.35 in isoprene weight and physical characteristics equal to those reported for the sample in Example 1.

What is claimed is:
1. Process for the production of butyl rubber through the copolymerization of isobutylene and isoprene wherein the improvement comprises conducting the copolymerization reaction in the presence of a catalytic system consisting essentially of:
   (a) a metalorganic compound of aluminum having the formula $AlR_3$ or $AlR_2X$ wherein X is a halogen atom and R is a hyrocarbon radical with from 1 to 10 carbon atoms, or hydrogen; and
   (b) a compound containing a mobile halogen group or at least one in which the halogen group is easily exchangeable due to the presence of an electrophilic group represented by the formula

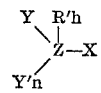

wherein X is an atom of halogen, Z is nitrogen, carbon or phosphorous; R' is a hydrocarbon radical with from 1 to 10 carbon atoms, or hydrogen, or is equal to X; Y is a member of the group consisting of

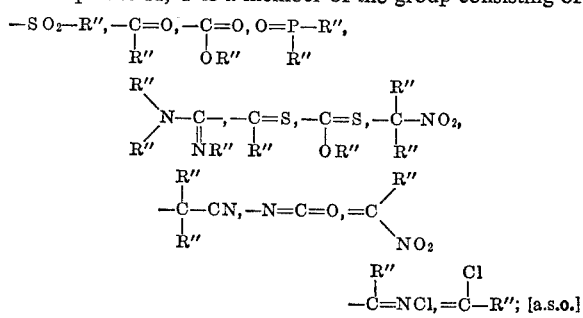

Y' is equal to Y, or to R'; Y or Y' may be a bivalent radical linked through a double bond directly to Z; Y and Y' may be connected to each other closing themselves cyclically on Z; R" is an alkylic or arylic radical, simple or substituted; $n$ and $h$ are 0 or 1.

2. Process according to claim 1 characterized by the fact that the molar ratio between the total quantity of compound (b) and compound (a) is less than 1.

3. Process according to claim 2 characterized by the fact that the polymerization reaction is effected in the presence of a reaction medium selected from the group consisting of aliphatic hydrocarbons, aromatic hydrocarbons, cycloaliphatic hydrocarbons mono- and poly- halogenates.

4. Process according to claim 3, characterized by the fact that the reaction medium is methyl chloride.

5. Process according to claim 1 characterized by the fact that the copolymerization is effected in the temperature range between −100 and +30° C. inclusive.

6. Process according to claim 1 characterized by the fact that the copolymerization reaction is effected by feeding to the zone of reaction a mixture of isobutylene and isoprene in quantities ranging from 90 to 99.5% of isobutylene by weight and from 10 to 0.5% of isoprene by weight.

References Cited
UNITED STATES PATENTS

| | | | |
|---|---|---|---|
| 3,380,981 | 4/1968 | Miller et al. | 260—85.3 R |
| 2,581,154 | 1/1952 | Walsh, Jr. et al. | 260—85.3 R |
| 2,931,791 | 4/1960 | Ernst et al. | 260—85.3 R |
| 3,560,458 | 2/1971 | Kennedy et al. | 260—85.3 R |
| 3,694,377 | 9/1972 | Kennedy et al. | 260—85.3 R |
| 3,753,959 | 8/1973 | Ichikawa et al. | 260—85.3 R |

JOSEPH L. SCHOFER, Primary Examiner

A. HOLLER, Assistant Examiner

U.S. Cl. X.R.

260—79.5 C, 85.3 C, 94.8

UNITED STATES PATENT AND TRADEMARK OFFICE
CERTIFICATE OF CORRECTION

PATENT NO. : 3,850,895
DATED : November 26, 1974
INVENTOR(S) : Aldo Priola, Sebastiano Cesca and Giuseppe Ferraris It is certified that error appears in the above-identified patent and that said Letters Patent are hereby corrected as shown below:

Column 1, line 65, change "comprising" to read --compromising--.

Column 2, line 25, after "ease" change "to the" to -- of --.

line 26, after "owing" change "of" to read

-- to the --.

Column 6, line 49, correct spelling of "hydrocarbon".

Signed and Sealed this twenty-fifth Day of November 1975

[SEAL]

Attest:

RUTH C. MASON
Attesting Officer

C. MARSHALL DANN
Commissioner of Patents and Trademarks